(12) United States Patent
Roffet et al.

(10) Patent No.: US 9,147,236 B2
(45) Date of Patent: Sep. 29, 2015

(54) METHOD AND DEVICE FOR GENERATING HIGH DYNAMIC RANGE IMAGES

(71) Applicant: STMicroelectronics (Grenoble 2) SAS, Grenoble (FR)

(72) Inventors: Gregory Roffet, Coublevie (FR); Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 31 days.

(21) Appl. No.: 14/195,472

(22) Filed: Mar. 3, 2014

(65) Prior Publication Data

US 2014/0247979 A1 Sep. 4, 2014

(30) Foreign Application Priority Data

Mar. 4, 2013 (FR) ...................................... 13 51880

(51) Int. Cl.
- *G06K 9/00* (2006.01)
- *G06T 5/00* (2006.01)
- *H04N 5/235* (2006.01)

(52) U.S. Cl.
CPC ............... *G06T 5/009* (2013.01); *H04N 5/235* (2013.01); *G06T 2207/10016* (2013.01); *G06T 2207/10024* (2013.01); *G06T 2207/10144* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 3,971,065 A * | 7/1976 | Bayer | ............................ | 348/276 |
| 5,504,524 A * | 4/1996 | Lu et al. | ...................... | 348/223.1 |
| 5,791,781 A * | 8/1998 | Park et al. | ....................... | 374/159 |
| 6,720,993 B1 * | 4/2004 | Hwang et al. | ............. | 348/208.13 |
| 6,876,384 B1 * | 4/2005 | Hubina et al. | .............. | 348/223.1 |
| 7,176,965 B1 * | 2/2007 | Noguchi | ..................... | 348/222.1 |
| 2004/0170316 A1 * | 9/2004 | Saquib et al. | .................. | 382/162 |
| 2008/0267530 A1 | 10/2008 | Lim | | |
| 2009/0310884 A1 * | 12/2009 | Lee et al. | ....................... | 382/274 |
| 2010/0157078 A1 * | 6/2010 | Atanassov et al. | .......... | 348/222.1 |
| 2010/0295977 A1 | 11/2010 | Manabe | | |
| 2011/0194850 A1 * | 8/2011 | Joo | ............................... | 396/213 |
| 2012/0070084 A1 * | 3/2012 | Yu | ................................ | 382/170 |
| 2012/0308082 A1 * | 12/2012 | Murao et al. | ................... | 382/103 |
| 2013/0093930 A1 * | 4/2013 | Mihara et al. | ................. | 348/294 |

FOREIGN PATENT DOCUMENTS

CN 102523394 A 6/2012

* cited by examiner

*Primary Examiner* — Andrae S Allison
(74) *Attorney, Agent, or Firm* — Seed IP Law Group PLLC

(57) ABSTRACT

A method of generation, by a digital processing device, of a first high dynamic range digital image from second and third digital images of a same scene, including, for at least one point of the first image: determining a brightness index; comparing this index with at least one of first, second, third, and fourth decreasing thresholds stored in a memory; and determining the value of the point by taking into account the value of the index.

25 Claims, 2 Drawing Sheets

METHOD AND DEVICE FOR GENERATING HIGH DYNAMIC RANGE IMAGES

BACKGROUND

1. Technical Field

The present disclosure relates to high dynamic range imaging.

2. Description of the Related Art

A standard image sensor comprises an array of photodetector cells, providing signals representative of the illumination levels received by the different photodetectors. Such a sensor may acquire a digitized image of a scene, or digital image. Such a sensor can however only discriminate a finite number of levels of illumination received by each photodetector. It is thus not always possible to capture the entire illumination range or dynamic range available in a scene with a single level of photodetector exposure, especially when the scene has a high contrast.

To obtain a high dynamic range image, it has already been provided to successively acquire two images of a same scene with different levels of exposure of the sensor, and then to merge these images in a high dynamic range image, wherein the values of the image points or pixels corresponding to the darkest areas of the scene are based on the values of the corresponding pixels of the image acquired with the highest exposure level, and the values of the pixels corresponding to the brightest areas in the scene are based on the values of the corresponding pixels of the image acquired with the lowest exposure level.

BRIEF SUMMARY

An embodiment provides a method of generation, by a digital processing device, of a first high dynamic range digital image from second and third digital images of a same scene, comprising, for at least one point of the first image: determining a brightness index; comparing this value with at least one of first, second, third, and fourth decreasing thresholds stored in a memory; and determining the value of the point by taking into account the value of the index.

According to an embodiment: if the index is greater than the first threshold, the value of the point is determined based on a first calculation formula; if the index is within the range from the second threshold to the first threshold, the value of the point is determined based on a second calculation formula; if the index ranges between the third threshold and the second threshold, the value of the point is determined based on a third calculation formula; if the index is within the range from the fourth threshold to the third threshold, the value of the point is determined based on a fourth calculation formula; and if the index is smaller than the fourth threshold, the value of the point is determined based on a fifth calculation formula.

According to an embodiment, if the index is greater than the first threshold, the value of the point takes into account the value of the corresponding point of the third image and does not take the second image into account; if the index is within the range from the second threshold to the first threshold, the value of the point takes into account the values of the corresponding points of the second and third images; if the index ranges between the third threshold and the second threshold, the value of the point takes into account the values of the corresponding points of the second and third images; if the index is within the range from the fourth threshold to the third threshold, the value of the point takes into account the values of the corresponding points of the second and third images; and if the index is lower than the fourth threshold, the value of the point takes into account the value of the corresponding point of the second image and does not take into account the third image.

According to an embodiment: if the index is greater than the first threshold, the value of the point is equal to the value of the corresponding point of the third image multiplied by an exposure correction factor EV; if the index is within the range from the second threshold to the first threshold, value Ih(i) of said point is determined by formula $$Ih(i) = \frac{1}{2}\left(Ib(i) * EV + \frac{Ia(i) + Ib(i) * EV}{2}\right),$$

where Ia(i) and Ib(i) respectively designate the values of the corresponding points of the second and third images; if the index ranges between the third threshold and the second threshold, value Ih(i) of said point is determined by formula $$Ih(i) = \frac{1}{2}\left(\frac{(B(i) - S3')Ib(i) * EV + (S2' - B(i))Ia(i)}{S2' - S3'} + \frac{Ia(i) + Ib(i) * EV}{2}\right),$$

where B(i), S2', and S3' respectively designate the brightness index and the second and third thresholds; if the index is within the range from the fourth threshold to the third threshold, value Ih(i) of the point is determined by formula $$Ih(i) = \frac{1}{2}\left(Ia(i) + \frac{Ia(i) + Ib(i) * EV}{2}\right);$$

and if the index is lower than the fourth threshold, the value of the point is equal to the value of the corresponding point of the second image.

According to an embodiment, the second and third images are successively acquired by a same sensor with different exposure levels.

According to an embodiment the exposure level of the second image is greater than the exposure level of the third image.

According to an embodiment, the second and third images are mosaic color images, wherein the value of each image point represents the level of a single color of a color base, for example, the red, green, and blue base.

According to an embodiment, the points of the first, second, and third images are gathered in elementary macroblocks having the same base color distribution.

According to an embodiment, the index is based on the values of the points of the macroblock of the second image containing the corresponding point of the second image.

According to an embodiment, the index is equal to the highest value of the points of the macroblock of the second image containing the corresponding point of the second image.

According to an embodiment, the pixels of the first image are coded over a greater number of bits than the pixels of the second and third images.

Another embodiment provides a device for generating a first high dynamic range image from second and third digital images of a same scene, comprising circuits capable of implementing a method of the above-mentioned type.

Another embodiment provides an image acquisition device comprising, on a same integrated circuit chip, an image sensor and a device of the above-mentioned type.

In an embodiment, a method comprises: generating an output image of a scene based on at least two input images of the scene, the generating including, determining, using at least one image processing device, a brightness index associated with a pixel of an image of the at least two input images; and determining, using the at least one image processing device, a value of corresponding pixel in the output image of the scene based on a relationship between the brightness index and four different threshold values. In an embodiment, the first threshold value is greater than the second threshold value; the second threshold value is greater than the third threshold value; the third threshold value is greater than the fourth threshold value; if said index is greater than the first threshold value, the value of the corresponding pixel in the output image is determined based on a first function; if said index is between the second threshold value and the first threshold value, the value of the corresponding pixel in the output image is determined based on a second function; if said index is between the third threshold value and the second threshold value, the value of the corresponding pixel in the output image is determined based on a third function; if said index is between the fourth threshold value and the third threshold value, the value of the corresponding pixel in the output image is determined based on a fourth function; and if said index is lower than the fourth threshold value, the value of the corresponding pixel in the output image is determined based on a fifth function. In an embodiment, the first threshold value is greater than the second threshold value; the second threshold value is greater than the third threshold value; the third threshold value is greater than the fourth threshold value; if said index is greater than the first threshold value, the value of the corresponding pixel in the output image is based on a value of a corresponding pixel of a first input image of the scene without taking into account a value of a corresponding pixel in a second input image of the scene; if said index is between the second threshold value and the first threshold value, the value of the corresponding pixel in the output image is based on the values of the corresponding points of the first and second input images; if said index is between the third threshold value and the second threshold value, the value of the corresponding pixel in the output image is based on the values of the corresponding points of the first and second input images; if said index is between the fourth threshold value and the third threshold value, the value of the corresponding pixel in the output image is based on the values of the corresponding points of the first and second input images; and if said index is lower than the fourth threshold value, the value of the corresponding pixel in the output image is based on the value of the corresponding pixel of the second image without taking into account a value of the corresponding pixel of the first input image. In an embodiment, the first threshold value is greater than the second threshold value; the second threshold value is greater than the third threshold value; the third threshold value is greater than the fourth threshold value; if said index (B(i)) is greater than the first threshold value, the value of the corresponding pixel in the output image (Ih(i)) is equal to the value of the corresponding point (Ib(i)) in a first input image multiplied by an exposure correction factor EV; if said index (B(i)) is between the second threshold value and the first threshold value, the value (Ih(i)) of the corresponding pixel in the output image is determined by $$Ih(i) = \frac{1}{2}\left(Ib(i) * EV + \frac{Ia(i) + Ib(i) * EV}{2}\right),$$

where Ia(i) and Ib(i) respectively designate the values of corresponding pixels of a second input image (Ia) and the first input image (Ib); if said index (B(i)) is between the third threshold value and the second threshold value, the value of the corresponding pixel in the output image is determined by $$Ih(i) = \frac{1}{2}\left(\frac{(B(i) - S3')Ib(i) * EV + (S2' - B(i))Ia(i)}{S2' - S3'} + \frac{Ia(i) + Ib(i) * EV}{2}\right),$$

where B(i), S2', and S3' respectively designate the brightness index and the second and third thresholds values; if said index is between the fourth threshold value and the third threshold value, the value of the corresponding pixel in the output image said point is determined by $$Ih(i) = \frac{1}{2}\left(Ia(i) + \frac{Ia(i) + Ib(i) * EV}{2}\right);$$

and
if said index is lower than the fourth threshold value, the value of the corresponding pixel in the output image is equal to the value of the corresponding point of the second input image. In an embodiment the at least two input images are successively acquired by a sensor using different exposure levels. In an embodiment, an exposure level of a first input image of the at least two input images is greater than an exposure level of a second input image of the at least two input images. In an embodiment, the at least two input images are mosaic color images, wherein the value of the corresponding pixel in the output image represents a level of a single color of a color base. In an embodiment, points of the at least two input images and the output image are gathered in elementary macroblocks having the same base color distribution. In an embodiment, said index is based on the values of the points of the macroblock of one of the at least two input images containing the corresponding point of the one of the at least two input images. In an embodiment, said index is equal to the highest value of the points of the macroblock of the one of the at least two input images. In an embodiment, the pixels of the output image are coded over a greater number of bits than the pixels of the at least two input images.

In an embodiment, a device comprises: one or more inputs configured to receive input images of a scene; and one or more processing devices configured to generate an output image of the scene based on two or more received input images of the scene by: determining a brightness index associated with a pixel of an input image of the scene; and determining a value of corresponding pixel in the output image of the scene based on a relationship between the determined brightness index and at least four different brightness threshold values. In an embodiment, the first threshold value is greater than the second threshold value; the second threshold value is greater than the third threshold value; the third threshold value is greater than the fourth threshold value; if said index is greater than the first threshold value, the value of the corresponding pixel in the output image is determined based on a first function; if said index is between the second threshold value and the first threshold value, the value of the corresponding pixel in the output image is determined based on a second function; if said index is between the third threshold value and the second threshold value, the value of the corresponding pixel in the output image is determined based on a third function; if said index is between the fourth threshold value and the third threshold value, the value of the corresponding pixel in the output image is determined based on a fourth function; and if said index is lower than the fourth threshold value, the value of the corresponding pixel in the output image is determined based on a fifth function. In an embodiment, if said index is greater than the first threshold value, the value of the corresponding pixel in the output image is based on a value of a corresponding pixel of a first input image of the scene without taking into account a value of a corresponding pixel in a second input image of the scene; if said index is between the second threshold value and the first threshold value, the value of the corresponding pixel in the output image is based on the values of the corresponding points of the first and second input images; if said index is between the third threshold value and the second threshold value, the value of the corresponding pixel in the output image is based on the values of the corresponding points of the first and second input images; if said index is between the fourth threshold value and the third threshold value, the value of the corresponding pixel in the output image is based on the values of the corresponding points of the first and second input images; and if said index is lower than the fourth threshold value, the value of the corresponding pixel in the output image is based on the value of the corresponding pixel of the second image without taking into account a value of the corresponding pixel of the first input image. In an embodiment, the one or more processing devices comprises a multiplier configured to multiply a value of a point in an input image by an exposure correction factor. In an embodiment, the one or more processing devices are configured to determining the brightness index associated with the pixel of the input image of the scene by determining a brightness index associated with a macroblock of the input image of the scene including the pixel of the input image of the scene. In an embodiment, said index is equal to a highest value of points of the macroblock. In an embodiment, the one or more processing devices are configured to code pixels of the output image over a greater number of bits than a number of bits used to code pixels of the input images.

In an embodiment, a system comprises: an image sensor; and one or more processing devices coupled to the image sensor and configured to generate an output image of the scene based on input images of the scene by: determining a brightness index associated with a pixel of an input image of the scene; and determining a value of corresponding pixel in the output image of the scene based on a relationship between the determined brightness index and at least four different brightness threshold values. In an embodiment, the first threshold value is greater than the second threshold value; the second threshold value is greater than the third threshold value; the third threshold value is greater than the fourth threshold value; if said index is greater than the first threshold value, the value of the corresponding pixel in the output image is determined based on a first function; if said index is between the second threshold value and the first threshold value, the value of the corresponding pixel in the output image is determined based on a second function; if said index is between the third threshold value and the second threshold value, the value of the corresponding pixel in the output image is determined based on a third function; if said index is between the fourth threshold value and the third threshold value, the value of the corresponding pixel in the output image is determined based on a fourth function; and if said index is lower than the fourth threshold value, the value of the corresponding pixel in the output image is determined based on a fifth function. In an embodiment, the one or more processing devices are configured to determining the brightness index associated with the pixel of the input image of the scene by determining a brightness index associated with a macroblock of the input image of the scene including the pixel of the input image of the scene. In an embodiment the system comprises an integrated circuit including the one or more processing devices and the image sensor.

In an embodiment, a non-transitory computer-readable memory medium's contents configure one or processing devices to generate an output image of a scene based on a plurality of input images of the scene by: determining a brightness index associated with a pixel of an input image of the scene; determining a value of corresponding pixel in an output image of the scene based on a relationship between the determined brightness index and at least four different brightness threshold values. In an embodiment, the first threshold value is greater than the second threshold value; the second threshold value is greater than the third threshold value; the third threshold value is greater than the fourth threshold value; if said index is greater than the first threshold value, the value of the corresponding pixel in the output image is determined based on a first function; if said index is between the second threshold value and the first threshold value, the value of the corresponding pixel in the output image is determined based on a second function; if said index is between the third threshold value and the second threshold value, the value of the corresponding pixel in the output image is determined based on a third function; if said index is between the fourth threshold value and the third threshold value, the value of the corresponding pixel in the output image is determined based on a fourth function; and if said index is lower than the fourth threshold value, the value of the corresponding pixel in the output image is determined based on a fifth function. In an embodiment, determining the brightness index associated with the pixel of the input image of the scene comprises determining a brightness index associated with a macroblock of the input image of the scene including the pixel of the input image of the scene.

BRIEF DESCRIPTION OF THE SEVERAL VIEWS OF THE DRAWINGS

The foregoing and other features and advantages will be discussed in detail in the following non-limiting description of specific embodiments in connection with the accompanying drawings.

For clarity, the same elements have been designated with the same reference numerals in the different drawings, unless the context indicates otherwise.

DETAILED DESCRIPTION

Figure 1:
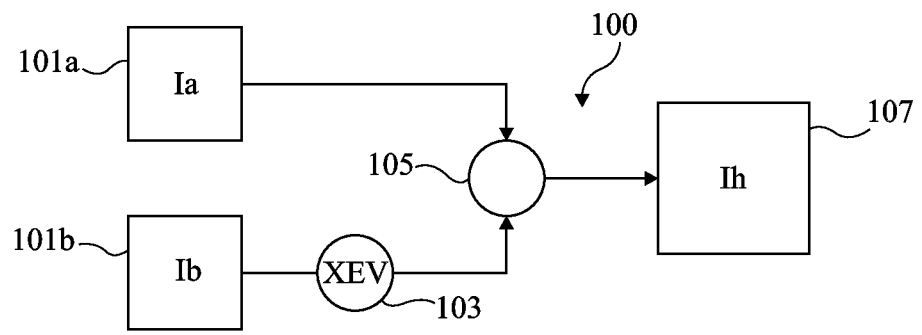
FIG. 1 schematically illustrates in the form of blocks an example of a high dynamic range image generation device.

In the following description, certain details are set forth in order to provide a thorough understanding of various embodiments of devices, methods and articles. However, one of skill in the art will understand that other embodiments may be practiced without these details. In other instances, well-known structures and methods associated with, for example, signal processing devices, have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings. In the drawings, the same features have been designated with the same reference numerals, unless the context indicates otherwise.

FIG. 1 schematically illustrates, in the form of blocks, an example of a device 100 configured to generate a high dynamic range image Ih based on two images Ia and Ib of a same scene, successively acquired by a same sensor (not shown) with different sensor exposure levels, for example, with different integration times and/or different apertures, and/or different sensitivity settings and/or different analog gain settings. In this example, image Ia is more strongly exposed than image Ib. Images Ia, Ib, and Ih for example have the same resolution, that is, the same number of pixels, but the values of the pixels of image Ih may be coded over a larger number of bits than the values of the pixels of images Ia and Ib. Device 100 of FIG. 1 comprises two memories 101a and 101b configured to store images Ia and Ib, respectively, and a memory 107 configured to store image Ih. Device 100 further comprises a multiplication circuit 103 and a processing circuit 105.

Figure 2:
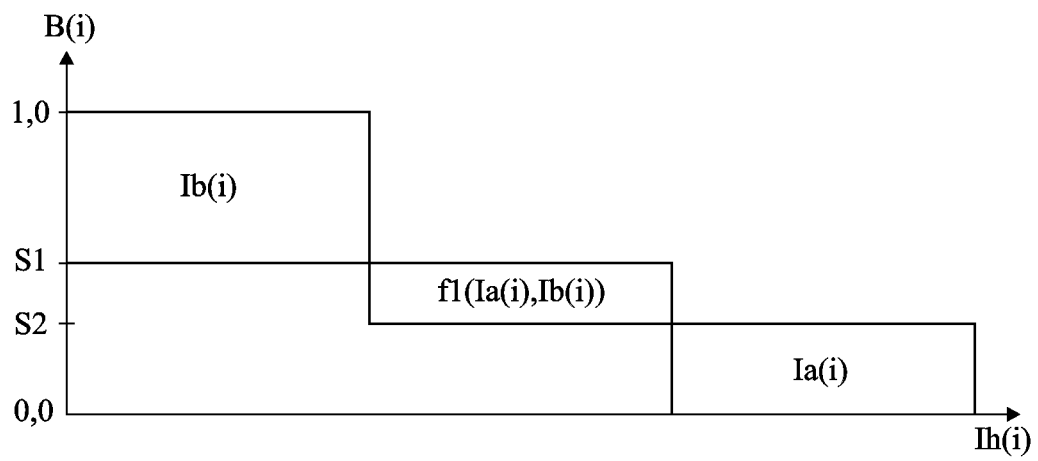
FIG. 2 is a diagram schematically illustrating the operation of an example of a high dynamic range image generation method.

FIG. 2 illustrates the operation of an example of a method for generating a high dynamic range image capable of being implemented, for example, by the device of FIG. 1. For convenience, the method of FIG. 2 is described in the context of the device of FIG. 1.

For each pixel Ih(i) of image Ih, where i is an integer ranging from 1 to n and n is an integer greater than 1 designating the number of pixels of images Ia, Ib, and Ih, a brightness index B(i) is determined, for example, by processing circuit 105. In this example, index B(i) is based on the value of the corresponding pixel Ia(i) of image Ia, that is, of the pixel of same position as pixel Ih(i) in the pixel array of image Ia. If image Ia is a grey-level image, index B(i) is for example proportional to the value of pixel Ia(i). If image Ia is a color image where the value of each pixel Ia(i) comprises several components respectively representing the color levels of the pixel in each of the colors of a color base (for example, the red, green, and blue base), index B(i) is for example proportional to the pixel luminance, that is, to a weighted average of the pixel components. In this example, brightness index B(i) is normalized to a scale ranging from 0 to 1, with 0 corresponding to the lowest brightness and 1 corresponding to a strongest brightness. According to the value of index B(i) obtained for pixel Ih(i), processing circuit 105 determines the value of pixel Ih(i) according to the following rules.

If index B(i) is greater than a threshold S1, the value of pixel Ih(i) is equal to the value of the corresponding pixel Ib(i) of image Ib, multiplied, by circuit 103, by an exposure correction factor EV representative of the exposure level difference between images Ia and Ib.

If index B(i) is lower than a threshold S2 lower than threshold S1, the value of pixel Ih(i) of image Ih is equal to the value of the corresponding pixel Ia(i) of image Ia.

If index B(i) ranges between threshold S2 and threshold S1, the value of pixel Ih(i) is determined according to the following formula f1:

$$Ih(i) = \frac{(B(i) - S2) * Ib(i) * EV + (S1 - B(i)) * Ia(i)}{S1 - S2}.$$

In the case of color images where the value of each pixel comprises several components respectively representing the base color levels of the pixel, the above-mentioned rules may be applied independently for each of the base colors (terms Ih(i), Ia(i), and Ib(i) then designate the values of a single color component of the corresponding pixels and, for each pixel, the above-mentioned rules are applied as many times as there are colors in the color base of the image—three times in the case of a red, green, and blue base).

A problem posed is due to the fact that the image sensor is not exposed in the same conditions on acquisition of images Ia and Ib, and that, accordingly, the signal-to-noise ratio in image Ia is different from the signal-to-noise ratio in image Ib. As a result, in image Ih, the variation curve of the signal-to-noise ratio according to the brightness level comprises two abrupt inflexion points, respectively corresponding to the crossing of brightness thresholds S1 and S2, and thus to the changes of the calculation mode of the values of the pixels of image Ih. This results in unwanted visible artifacts on the image.

Figure 3:
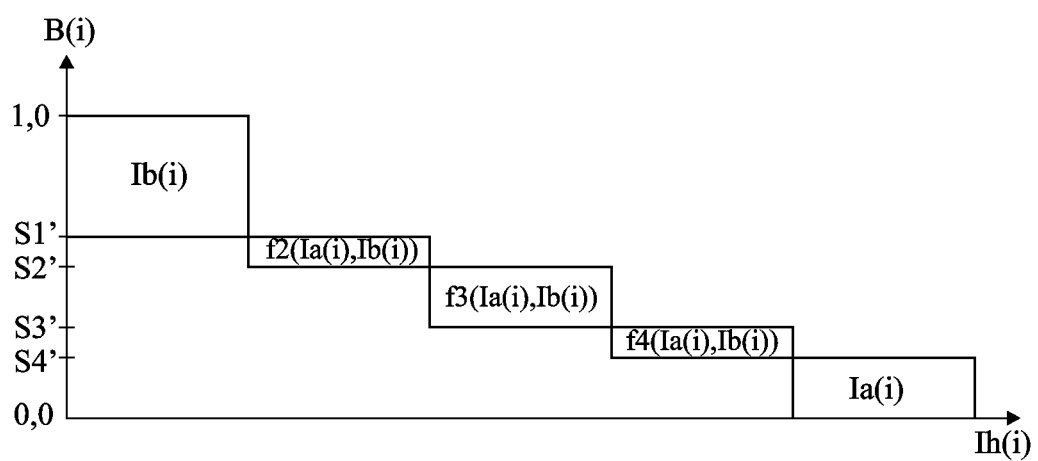
FIG. 3 is a diagram schematically illustrating the operation of an embodiment of a high dynamic range image generation method.

FIG. 3 illustrates the operation of an embodiment of a method for generating a high dynamic range image, which a device such as the device of FIG. 1 may be configured to implement.

As in the method of FIG. 2, it is desired to obtain a high dynamic range image Ih based on two images Ia and Ib of a same scene, successively acquired by a same sensor with different sensor exposure levels, for example, with different integration times and/or different apertures and/or different sensitivity settings. In this example, image Ia is more strongly exposed than image Ib, and images Ia, Ib, and Ih have the same resolution. The values of the pixels of image Ih may be coded over a larger number of bits than the values of the pixels of images Ia and Ib.

For each pixel Ih(i) of image Ih, a brightness index B(i) is determined by processing circuit 105. In this example, index B(i) is based on the value of the corresponding pixel Ia(i) of image Ia. If image Ia is a grey-level image, index B(i) is for example proportional to the value of pixel Ia(i). If image Ia is a color image where the value of each pixel Ia(i) comprises several components respectively representing the color levels of the pixel in each of the colors of a color base, index B(i) is for example proportional to the pixel luminance, that is, to a weighted average of the pixel color components. In this example, brightness index B(i) is normalized to a scale ranging from 0 to 1, with 0 corresponding to the lowest brightness and 1 corresponding to the strongest brightness. According to the value of index B(i) determined for pixel Ih(i), processing circuit 105 determines the value of pixel Ih(i) according to the following rules.

If index B(i) is greater than a threshold S1', the value of pixel Ih(i) is equal to the value of the corresponding pixel Ib(i) of image Ib, multiplied by an exposure correction factor representative of the exposure level difference between images Ia and Ib.

If index B(i) is within a range from threshold S1' to a threshold S2' lower than threshold S1', the value of pixel Ih(i) is determined by the following formula f2:

$$Ih(i) = \frac{1}{2}\left(Ib(i)*EV + \frac{Ia(i)+Ib(i)*EV}{2}\right),$$

where EV is an exposure correction factor representative of the exposure level difference between images Ia and Ib.

If index B(i) ranges between threshold S2' and a threshold S3' lower than threshold S2', the value of pixel Ih(i) is determined by the following formula f3:

$$Ih(i) = \frac{1}{2}\left(\frac{(B(i)-S3')Ib(i)*EV + (S2'-B(i))Ia(i)}{S2'-S3'} + \frac{Ia(i)+Ib(i)*EV}{2}\right).$$

If index B(i) is within a range from threshold S3' to a threshold S4' lower than threshold S3', the value of pixel Ih(i) is determined according to the following formula f4:

$$Ih(i) = \frac{1}{2}\left(Ia(i) + \frac{Ia(i)+Ib(i)*EV}{2}\right).$$

If index B(i) is lower than threshold S4', the value of pixel Ih(i) of image Ih is equal to the value of the corresponding pixel Ia(i) of image Ia.

In the case where images Ia, Ib, and Ih are color images where the value of each pixel comprises several components respectively representing the base color levels of the pixel, the above-mentioned calculation rules may be applied independently for each of the base colors.

For each pixel Ih(i), the pixel value determined by processing circuit 105 may be stored in memory 107, to generate a high dynamic range image Ih.

An advantage of the method for generating a high dynamic range image described in relation with FIG. 3 is that it enables, as compared with the method described in relation with FIG. 2, to significantly smooth the inflexions of the curve of variation of the signal-to-noise ratio according to the pixel brightness level in image Ih. As a result, the high dynamic range images obtained by the method of FIG. 3 comprise much less visible artifacts due to the variations of the signal-to-noise ratio in the image than images obtained by the method of FIG. 2.

Figure 4:
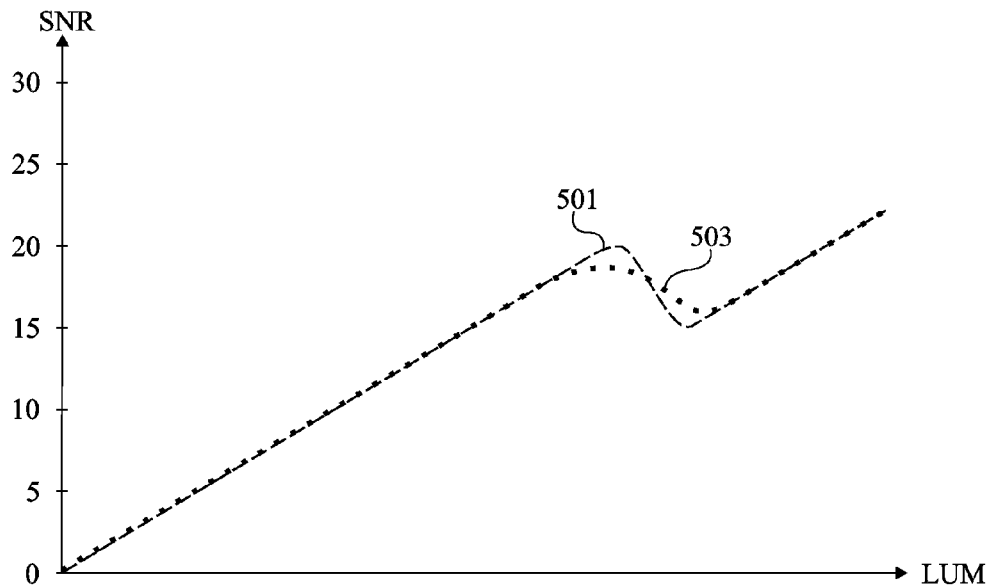
FIG. 4 is a diagram comparing the performance of the method of FIGS. 2 and 3 in terms of signal-to-noise ratio in the obtained high dynamic range image.

FIG. 4 is a diagram showing the variation of signal-to-noise ratio SNR according to brightness level LUM of the pixels in image Ih. Curve 501 of FIG. 4 corresponds to the case where image Ih is generated by the method of FIG. 2, and curve 503 of FIG. 4 corresponds to the case where image Ih is generated by the method of FIG. 3. Curve 501 comprises two abrupt inflexions respectively corresponding to the crossing of brightness thresholds S2 and S1. Curve 503 also comprises two inflexions, respectively corresponding to the crossing of brightness thresholds S3' and S2'. However, as appears in the drawing, the inflexions of curve 503 are much smoother than those of curve 501, which reflects as less visible parasitic artifacts on image Ih in the case where the method of FIG. 3 is used than in the case where the method of FIG. 2 is used.

In practice, the digital images directly provided at the output of a color image sensor are mosaic images where the value of each pixel represents the level of a single color of a color base, for example, the red, green, and blue base. Indeed, in a color image sensor, the photodetector array is covered with a mosaic or array of colored filters, for example, a Bayer filter, assigning to each photodetector a single color of a color base. To be exploitable, the mosaic images provided by the sensor may be submitted to so-called demosaicing processings, aiming at reconstructing, based on the data provided by each of the monochrome photodetectors of the sensor, an image in which the value of each pixel comprises a component of each of the base colors, to restore an image comprising a large number of colors.

In known high dynamic range image generation methods and devices, the construction of a high dynamic range image from initial images having different exposure levels is implemented after demosaicing of the initial images, that is, it is performed from initial images where the value of each pixel comprises several different color components.

In an embodiment, it is provided to implement a method for generating a high dynamic range digital image of the type described in relation with FIG. 3, where images Ia, Ib, and Ih are mosaic color images, where the value of each pixel represents the level of a single color of a color base.

As an example, the base color distribution is identical in images Ia, Ib, and Ih, and, in each image, the pixels are gathered in elementary macroblocks of neighboring pixels, each macroblock comprising pixels of all the base colors, and all macroblocks having the same base color distribution pattern. The base color distribution in images Ia, Ib, and Ih for example corresponds to the color distribution in a Bayer filter. As an example, the pixels are distributed in array macroblocks of two pixels by two, the pixels of coordinates (0, 0), (0, 1), (1, 0), and (1, 1) in each macroblock being respectively of red, green, and blue color, as illustrated in FIG. 5, in particular macroblock 502 of image Ia shown in thick lines in FIG. 5.

The method for generating image Ih may be identical or similar to the method described in relation with FIG. 3. However, in an embodiment, brightness index B(i) is the same for all pixels Ih(i) of a same macroblock. This enables to simplify the implementation of the method, since the determination of the brightness index, the comparison of this index with thresholds S1', S2', S3', and S4', and the selection of the calculation function to be implemented to calculate the values of the pixels of image Ih can be implemented only once per macroblock. As an example, for each pixel Ih(i), brightness index B(i) is equal to the maximum value of the pixels of the macroblock containing the corresponding pixel Ia(i) in image Ia. As a variation, index B(i) may be determined based on values of pixels of image Ib, or based on a combination of values of pixels of image Ia and of pixels of image Ib.

An embodiment may be implemented at the output of a color image sensor, before demosaicing of the mosaic images provided by the sensor. As an example, it may be provided that only high dynamic range image Ih is submitted to the demosaicing processing, which enables to limit the number of demosaicing operations. Further, a color image sensor having its high dynamic range image generation function integrated in the same semiconductor chip as the sensor may be provided.

Figure 5:
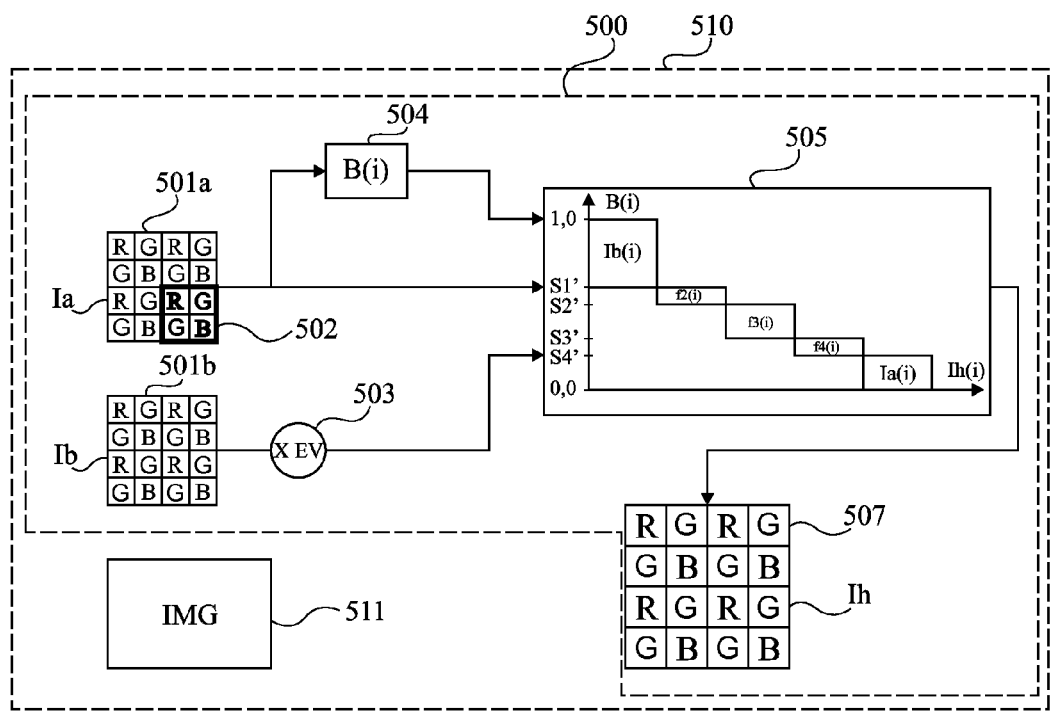
FIG. 5 is a diagram illustrating, in the form of blocks, an embodiment of an image acquisition device comprising a high dynamic range image generation device.

FIG. 5 schematically illustrates in the form of blocks an example of an image acquisition device 510 comprising a color sensor 511 (IMG) and a device 500 configured to generate a high dynamic range mosaic color image Ih from two mosaic color images Ia and Ib successively acquired by sensor 511 with different sensor exposure levels.

Device 500 comprises two memories 501a and 501b configured to respectively store images Ia and Ib acquired by sensor 511, and a memory 507 configured to contain image Ih. Device 500 further comprises a multiplication circuit 503, configured to multiple values of pixels of image Ib by an exposure correction factor EV. Device 500 further comprises a first processing circuit 504 configured to calculate, for each pixel macroblock of image Ih, a brightness index B(i) based on the values of one or several pixels of image Ia, and a second processing circuit 505, configured to calculate the output value of each pixel Ih(i) of image Ih by taking into account the value of brightness index B(i), according to a method of the type described in relation with FIG. 3. As an example, brightness thresholds S1', S2', S3', and S4' of the method of FIG. 3 are stored in a memory, not shown, and may be programmed or reprogrammed by a user. In an embodiment, device 500 and sensor 511 are integrated in a same integrated circuit chip.

Specific embodiments have been described. Various alterations, modifications, and improvements will readily occur to those skilled in the art.

In particular, the described embodiments are not limited to the above-described case where a high dynamic range image is generated from two initial images of different exposure levels. It will be within the abilities of those skilled in the art to adapt the described methods and devices to generate a high dynamic range image from a number of initial images greater than two.

Further, the described embodiments are not limited to the examples of high dynamic range image generation devices described in relation with FIGS. 1 and 5. More generally, it will be within the abilities of those skilled in the art to implement the described methods by using other devices comprising one or several digital signal processing elements.

Further, the described embodiments also aim at the case where the high dynamic range image generation function is dissociated from an image acquisition device and is for example implemented on a computer by means of image processing software.

Further, the described embodiments are not limited to the case where images Ia, Ib, and Ih have the same resolution.

Moreover, as a variation, in the described embodiments, the values of the pixels of the more strongly exposed initial image (image Ia in the above examples) may also be multiplied by a correction factor EV'. To achieve this, an additional multiplication circuit (not shown) may be provided in the devices of FIGS. 1 and 5. It will be within the abilities of those skilled in the art to adapt the above-mentioned formulas to this specific case.

Such alterations, modifications, and improvements are intended to be part of this disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    generating an output image of a scene based on at least two input images of the scene, the generating including,
    determining, using at least one image processing device, a brightness index associated with a pixel of an image of the at least two input images; and
    determining, using the at least one image processing device, a value of corresponding pixel in the output image of the scene based on a relationship between the brightness index and four different threshold values, wherein:
    the first threshold value is greater than the second threshold value;
    the second threshold value is greater than the third threshold value;
    the third threshold value is greater than the fourth threshold value;
    if said index is greater than the first threshold value, the value of the corresponding pixel in the output image is determined based on a first function;
    if said index is between the second threshold value and the first threshold value, the value of the corresponding pixel in the output image is determined based on a second function;
    if said index is between the third threshold value and the second threshold value, the value of the corresponding pixel in the output image is determined based on a third function;
    if said index is between the fourth threshold value and the third threshold value, the value of the corresponding pixel in the output image is determined based on a fourth function; and if said index is lower than the fourth threshold value, the value of the corresponding pixel in the output image is determined based on a fifth function.

2. The method of claim 1 wherein:
if said index is greater than the first threshold value, the value of the corresponding pixel in the output image is based on a value of a corresponding pixel of a first input image of the scene without taking into account a value of a corresponding pixel in a second input image of the scene;
if said index is between the second threshold value and the first threshold value, the value of the corresponding pixel in the output image is based on the values of the corresponding points of the first and second input images;
if said index is between the third threshold value and the second threshold value, the value of the corresponding pixel in the output image is based on the values of the corresponding points of the first and second input images;
if said index is between the fourth threshold value and the third threshold value, the value of the corresponding pixel in the output image is based on the values of the corresponding points of the first and second input images; and
if said index is lower than the fourth threshold value, the value of the corresponding pixel in the output image is based on the value of the corresponding pixel of the second image without taking into account a value of the corresponding pixel of the first input image.

3. The method of claim 1 wherein:
if said index (B(i)) is greater than the first threshold value, the value of the corresponding pixel in the output image (Ih(i)) is equal to the value of the corresponding point (Ib(i)) in a first input image multiplied by an exposure correction factor EV;
if said index (B(i)) is between the second threshold value and the first threshold value, the value (Ih(i)) of the corresponding pixel in the output image is determined by $$Ih(i) = \frac{1}{2}\left(Ib(i)*EV + \frac{Ia(i) + Ib(i)*EV}{2}\right),$$

where Ia(i) and Ib(i) respectively designate the values of corresponding pixels of a second input image (Ia) and the first input image (Ib);
if said index (B(i)) is between the third threshold value and the second threshold value, the value of the corresponding pixel in the output image is determined by $$Ih(i) = \frac{1}{2}\left(\frac{(B(i) - S3')Ib(i)*EV + (S2' - B(i))Ia(i)}{S2' - S3'} + \frac{Ia(i) + Ib(i)*EV}{2}\right),$$

where B(i), S2', and S3' respectively designate the brightness index and the second and third thresholds values;
if said index is between the fourth threshold value and the third threshold value, the value of the corresponding pixel in the output image said point is determined by $$Ih(i) = \frac{1}{2}\left(Ia(i) + \frac{Ia(i) + Ib(i)*EV}{2}\right);$$

and
if said index is lower than the fourth threshold value, the value of the corresponding pixel in the output image is equal to the value of the corresponding point of the second input image.

4. The method of claim 1 wherein the at least two input images are successively acquired by a sensor using different exposure levels.

5. The method of claim 1 wherein an exposure level of a first input image of the at least two input images is greater than an exposure level of a second input image of the at least two input images.

6. The method of claim 1 wherein the at least two input images are mosaic color images, wherein the value of the corresponding pixel in the output image represents a level of a single color of a color base.

7. The method of claim 6 wherein points of the at least two input images and the output image are gathered in elementary macroblocks having the same base color distribution.

8. The method of claim 7 wherein said index is based on the values of the points of the macroblock of one of the at least two input images containing the corresponding point of the one of the at least two input images.

9. The method of claim 8 wherein said index is equal to the highest value of the points of the macroblock of the one of the at least two input images.

10. The method of claim 1 wherein the pixels of the output image are coded over a greater number of bits than the pixels of the at least two input images.

11. A device, comprising:
one or more inputs configured to receive input images of a scene; and
image processing circuitry configured to generate an output image of the scene based on two or more received input images of the scene by:
determining a brightness index associated with a pixel of an input image of the scene; and
determining a value of corresponding pixel in the output image of the scene based on a relationship between the determined brightness index and at least four different brightness threshold values, wherein
the first threshold value is greater than the second threshold value;
the second threshold value is greater than the third threshold value;
the third threshold value is greater than the fourth threshold value;
if said index is greater than the first threshold value, the value of the corresponding pixel in the output image is determined based on a first function;
if said index is between the second threshold value and the first threshold value, the value of the corresponding pixel in the output image is determined based on a second function;
if said index is between the third threshold value and the second threshold value, the value of the corresponding pixel in the output image is determined based on a third function;
if said index is between the fourth threshold value and the third threshold value, the value of the corresponding pixel in the output image is determined based on a fourth function; and
if said index is lower than the fourth threshold value, the value of the corresponding pixel in the output image is determined based on a fifth function.

12. The device of claim 11 wherein:
   if said index is greater than the first threshold value, the value of the corresponding pixel in the output image is based on a value of a corresponding pixel of a first input image of the scene without taking into account a value of a corresponding pixel in a second input image of the scene;
   if said index is between the second threshold value and the first threshold value, the value of the corresponding pixel in the output image is based on the values of the corresponding points of the first and second input images;
   if said index is between the third threshold value and the second threshold value, the value of the corresponding pixel in the output image is based on the values of the corresponding points of the first and second input images;
   if said index is between the fourth threshold value and the third threshold value, the value of the corresponding pixel in the output image is based on the values of the corresponding points of the first and second input images; and
   if said index is lower than the fourth threshold value, the value of the corresponding pixel in the output image is based on the value of the corresponding pixel of the second image without taking into account a value of the corresponding pixel of the first input image.

13. The device of claim 11 wherein the image processing circuitry comprises a multiplier configured to multiply a value of a point in an input image by an exposure correction factor.

14. The device of claim 11 wherein the image processing circuitry is configured to determining the brightness index associated with the pixel of the input image of the scene by determining a brightness index associated with a macroblock of the input image of the scene including the pixel of the input image of the scene.

15. The device of claim 14 wherein said index is equal to a highest value of points of the macroblock.

16. The device of claim 11 wherein the image processing circuitry is configured to code pixels of the output image over a greater number of bits than a number of bits used to code pixels of the input images.

17. The device of claim 11 wherein,
   if said index (B(i)) is greater than the first threshold value, the value of the corresponding pixel in the output image (Ih(i)) is equal to the value of the corresponding point (Ib(i)) in a first input image multiplied by an exposure correction factor EV;
   if said index (B(i)) is between the second threshold value and the first threshold value, the value (Ih(i)) of the corresponding pixel in the output image is determined by $$Ih(i) = \frac{1}{2}\left(Ib(i)*EV + \frac{Ia(i) + Ib(i)*EV}{2}\right),$$

where Ia(i) and Ib(i) respectively designate the values of corresponding pixels of a second input image (Ia) and the first input image (Ib);
   if said index (B(i)) is between the third threshold value and the second threshold value, the value of the corresponding pixel in the output image is determined by $$Ih(i) = \frac{1}{2}\left(\frac{(B(i) - S3')Ib(i)*EV + (S2' - B(i))Ia(i)}{S2' - S3'} + \frac{Ia(i) + Ib(i)*EV}{2}\right),$$

where B(i), S2', and S3' respectively designate the brightness index and the second and third thresholds values;
   if said index is between the fourth threshold value and the third threshold value, the value of the corresponding pixel in the output image said point is determined by $$Ih(i) = \frac{1}{2}\left(Ia(i) + \frac{Ia(i) + Ib(i)*EV}{2}\right);$$

and
   if said index is lower than the fourth threshold value, the value of the corresponding pixel in the output image is equal to the value of the corresponding point of the second input image.

18. A system, comprising:
   an image sensor; and
   image processing circuitry coupled to the image sensor and configured to generate an output image of the scene based on input images of the scene by:
      determining a brightness index associated with a pixel of an input image of the scene; and
      determining a value of corresponding pixel in the output image of the scene based on a relationship between the determined brightness index and at least four different brightness threshold values, wherein
   the first threshold value is greater than the second threshold value;
   the second threshold value is greater than the third threshold value;
   the third threshold value is greater than the fourth threshold value;
   if said index is greater than the first threshold value, the value of the corresponding pixel in the output image is determined based on a first function;
   if said index is between the second threshold value and the first threshold value, the value of the corresponding pixel in the output image is determined based on a second function;
   if said index is between the third threshold value and the second threshold value, the value of the corresponding pixel in the output image is determined based on a third function;
   if said index is between the fourth threshold value and the third threshold value, the value of the corresponding pixel in the output image is determined based on a fourth function; and
   if said index is lower than the fourth threshold value, the value of the corresponding pixel in the output image is determined based on a fifth function.

19. The system of claim 18 wherein the image processing circuitry is configured to determining the brightness index associated with the pixel of the input image of the scene by determining a brightness index associated with a macroblock of the input image of the scene including the pixel of the input image of the scene.

20. The system of claim 18, comprising an integrated circuit including the image processing circuitry and the image sensor.

21. The system of claim 18 wherein,
   if said index (B(i)) is greater than the first threshold value, the value of the corresponding pixel in the output image (Ih(i)) is equal to the value of the corresponding point (Ib(i)) in a first input image multiplied by an exposure correction factor EV;

if said index (B(i)) is between the second threshold value and the first threshold value, the value (Ih(i)) of the corresponding pixel in the output image is determined by $$Ih(i) = \frac{1}{2}\left(Ib(i)*EV + \frac{Ia(i) + Ib(i)*EV}{2}\right),$$

where Ia(i) and Ib(i) respectively designate the values of corresponding pixels of a second input image (Ia) and the first input image (Ib);

if said index (B(i)) is between the third threshold value and the second threshold value, the value of the corresponding pixel in the output image is determined by $$Ih(i) = \frac{1}{2}\left(\frac{(B(i) - S3')Ib(i)*EV + (S2' - B(i))Ia(i)}{S2' - S3'} + \frac{Ia(i) + Ib(i)*EV}{2}\right),$$

where B(i), S2', and S3' respectively designate the brightness index and the second and third thresholds values;

if said index is between the fourth threshold value and the third threshold value, the value of the corresponding pixel in the output image said point is determined by $$Ih(i) = \frac{1}{2}\left(Ia(i) + \frac{Ia(i) + Ib(i)*EV}{2}\right);$$

and if said index is lower than the fourth threshold value, the value of the corresponding pixel in the output image is equal to the value of the corresponding point of the second input image.

22. The system of claim 18 wherein, if said index is greater than the first threshold value, the value of the corresponding pixel in the output image is based on a value of a corresponding pixel of a first input image of the scene without taking into account a value of a corresponding pixel in a second input image of the scene;

if said index is between the second threshold value and the first threshold value, the value of the corresponding pixel in the output image is based on the values of the corresponding points of the first and second input images;

if said index is between the third threshold value and the second threshold value, the value of the corresponding pixel in the output image is based on the values of the corresponding points of the first and second input images;

if said index is between the fourth threshold value and the third threshold value, the value of the corresponding pixel in the output image is based on the values of the corresponding points of the first and second input images; and if said index is lower than the fourth threshold value, the value of the corresponding pixel in the output image is based on the value of the corresponding pixel of the second image without taking into account a value of the corresponding pixel of the first input image.

23. A non-transitory computer-readable memory medium whose contents configure one or processing devices to generate an output image of a scene based on a plurality of input images of the scene by:

determining a brightness index associated with a pixel of an input image of the scene; and determining a value of corresponding pixel in an output image of the scene based on a relationship between the determined brightness index and at least four different brightness threshold values, wherein the first threshold value is greater than the second threshold value;

the second threshold value is greater than the third threshold value;

the third threshold value is greater than the fourth threshold value;

if said index is greater than the first threshold value, the value of the corresponding pixel in the output image is determined based on a first function;

if said index is between the second threshold value and the first threshold value, the value of the corresponding pixel in the output image is determined based on a second function;

if said index is between the third threshold value and the second threshold value, the value of the corresponding pixel in the output image is determined based on a third function;

if said index is between the fourth threshold value and the third threshold value, the value of the corresponding pixel in the output image is determined based on a fourth function; and if said index is lower than the fourth threshold value, the value of the corresponding pixel in the output image is determined based on a fifth function.

24. The non-transitory computer-readable medium of claim 23 wherein determining the brightness index associated with the pixel of the input image of the scene comprises determining a brightness index associated with a macroblock of the input image of the scene including the pixel of the input image of the scene.

25. The non-transitory computer-readable medium of claim 23 wherein, if said index is greater than the first threshold value, the value of the corresponding pixel in the output image is based on a value of a corresponding pixel of a first input image of the scene without taking into account a value of a corresponding pixel in a second input image of the scene;

if said index is between the second threshold value and the first threshold value, the value of the corresponding pixel in the output image is based on the values of the corresponding points of the first and second input images;

if said index is between the third threshold value and the second threshold value, the value of the corresponding pixel in the output image is based on the values of the corresponding points of the first and second input images;

if said index is between the fourth threshold value and the third threshold value, the value of the corresponding pixel in the output image is based on the values of the corresponding points of the first and second input images; and if said index is lower than the fourth threshold value, the value of the corresponding pixel in the output image is based on the value of the corresponding pixel of the second image without taking into account a value of the corresponding pixel of the first input image.

* * * * *